US010301020B2

(12) United States Patent
Jones et al.

(10) Patent No.: US 10,301,020 B2
(45) Date of Patent: May 28, 2019

(54) SYSTEMS AND METHODS OF DELIVERING PRODUCTS WITH UNMANNED DELIVERY AIRCRAFTS

(71) Applicant: Walmart Apollo, LLC, Bentonville, AR (US)

(72) Inventors: Nathan G. Jones, Bentonville, AR (US); Gregory A. Hicks, Rogers, AR (US); Donald R. High, Noel, MO (US)

(73) Assignee: Walmart Apollo, LLC, Bentonville, AR (US)

( * ) Notice: Subject to any disclaimer, the term of this patent is extended or adjusted under 35 U.S.C. 154(b) by 290 days.

(21) Appl. No.: 15/271,784

(22) Filed: Sep. 21, 2016

(65) Prior Publication Data

US 2017/0081028 A1  Mar. 23, 2017

Related U.S. Application Data

(60) Provisional application No. 62/222,572, filed on Sep. 23, 2015.

(51) Int. Cl.
*B64C 39/02* (2006.01)

(52) U.S. Cl.
CPC ...... *B64C 39/024* (2013.01); *B64C 2201/027* (2013.01); *B64C 2201/108* (2013.01); *B64C 2201/128* (2013.01)

(58) Field of Classification Search
CPC ............ B64C 39/024; B64C 2201/027; B64C 2201/108; B64C 2201/128; B66D 1/46;
(Continued)

(56) References Cited

U.S. PATENT DOCUMENTS 4,750,691 A * 6/1988 Hollrock ................. B66C 23/18
212/299
8,521,339 B2 * 8/2013 Gariepy ................. B64C 39/024
244/190

(Continued)

FOREIGN PATENT DOCUMENTS

WO  2007086628  8/2007

OTHER PUBLICATIONS

Madrigal, Alexis C.; "Inside Google's Secret Drone-Delivery Program—The Atlantic"; http://www.theatlantic.com/technology/archive/2014/08/insidegooglessecretdronedeliveryprogram/379306/; Aug. 28, 2014; pp. 1-26.

(Continued)

*Primary Examiner* — Timothy D Collins
*Assistant Examiner* — Tye William Abell
(74) *Attorney, Agent, or Firm* — Fitch, Even, Tabin & Flannery LLP

(57) ABSTRACT

In some embodiments, systems, apparatuses and methods are provided to enhance delivery of packages. Some embodiments provide an unmanned delivery system comprising: a rotational drive shaft; a crane motor cooperated with the drive shaft that is rotated by the crane motor; a first crane system with a first cord fixed with the first crane system, wherein the first crane system is configured to cooperate with the drive shaft to control the first crane system in controlling the spooling and retraction of the first cord; a control circuit coupled with the crane motor; and a stop switch electrically coupled with the control circuit and positioned to be contacted by a package release hanger secured with the first cord when the first cord is retracted to a first threshold; wherein the control circuit is configured to stop the crane motor in response to receiving a signal from the stop switch.

12 Claims, 2 Drawing Sheets

(58) Field of Classification Search
CPC ... B66D 1/56; B66D 1/60; B66D 1/48; B66D 1/26; B66D 1/16; B66D 1/14; B66D 3/18; B66C 1/38; B66C 1/66; B66C 13/30; B66C 13/18
See application file for complete search history.

(56) References Cited

U.S. PATENT DOCUMENTS

| | | | |
|---|---|---|---|
| 8,991,793 B1 | 3/2015 | Bernhardt | |
| 9,205,922 B1* | 12/2015 | Bouwer | B64D 9/00 |
| 9,517,838 B1* | 12/2016 | Howard | B64C 27/12 |
| 9,550,577 B1 | 1/2017 | Beckman | |
| 9,573,684 B2 | 2/2017 | Kimchi | |
| 9,580,173 B1* | 2/2017 | Burgess | B64C 39/024 |
| 9,650,136 B1* | 5/2017 | Haskin | B64D 1/12 |
| 9,676,477 B1* | 6/2017 | Kimchi | B64C 27/00 |
| 2011/0084162 A1 | 4/2011 | Goossen | |
| 2015/0041593 A1 | 2/2015 | Beaugavin | |
| 2015/0120094 A1 | 4/2015 | Kimchi | |
| 2015/0158587 A1* | 6/2015 | Patrick | B64C 39/024 244/137.4 |
| 2015/0277440 A1 | 10/2015 | Kimchi | |
| 2016/0196755 A1 | 7/2016 | Navot | |
| 2016/0257401 A1 | 9/2016 | Buchmueller | |
| 2017/0029104 A1* | 2/2017 | Kim | B64C 39/02 |
| 2017/0110017 A1 | 4/2017 | Kimchi | |
| 2017/0190510 A1* | 7/2017 | Porat | B65G 1/06 |
| 2017/0247109 A1* | 8/2017 | Buchmueller | B64D 1/12 |
| 2018/0072419 A1* | 3/2018 | Burgess | B64D 1/12 |

OTHER PUBLICATIONS

Szkotak, Steve; "Drone to deliver medical supplies to southwest VA. Clinic—Washington Times" http://www.washingtontimes.com/news/2015/jul/15/dronetodelivermedicalsuppliestosouthwestva/?page=all; Jul. 15, 2015; pp. 1-8.

Flirtey; "Flirtey making history with the first US drone delivery" https://www.youtube.com/watch?v=xEm7bl_meQY; Published Jul. 19, 2015.

DoDo Pizza; "DoDo Pizza—First Drone Delivery directly to office"; https://www.youtube.com/watch?v=c0QnJpjaRjc; Published Jun. 29, 2014.

Zooratedproductions; "Dropping Stuff From a Drone"; https://www.youtube.com/watch?v=TsXMBBPjiKY; Published Jul. 17, 2014.

PCT; App. No. PCT/US2016/052830; International Search Report and Written Opinion dated Dec. 9, 2016.

* cited by examiner

SYSTEMS AND METHODS OF DELIVERING PRODUCTS WITH UNMANNED DELIVERY AIRCRAFTS

CROSS-REFERENCE TO RELATED APPLICATION

This application claims the benefit of U.S. Provisional Application No. 62/222,572, filed Sep. 23, 2015, which is incorporated herein by reference in its entirety.

TECHNICAL FIELD

This invention relates generally to product deliveries using unmanned delivery aircraft.

BACKGROUND

In a modern retail environment, there is a need to improve the customer service and/or convenience for the customer. One aspect of customer service is the delivery of products. There are numerous ways to delivery products to customers. Getting the product to a delivery location, however, can cause undesirable delays, can add cost and reduce revenue.

BRIEF DESCRIPTION OF THE DRAWINGS

Disclosed herein are embodiments of systems, apparatuses and methods pertaining unmanned delivery aircraft. This description includes drawings, wherein.

Figure 1:
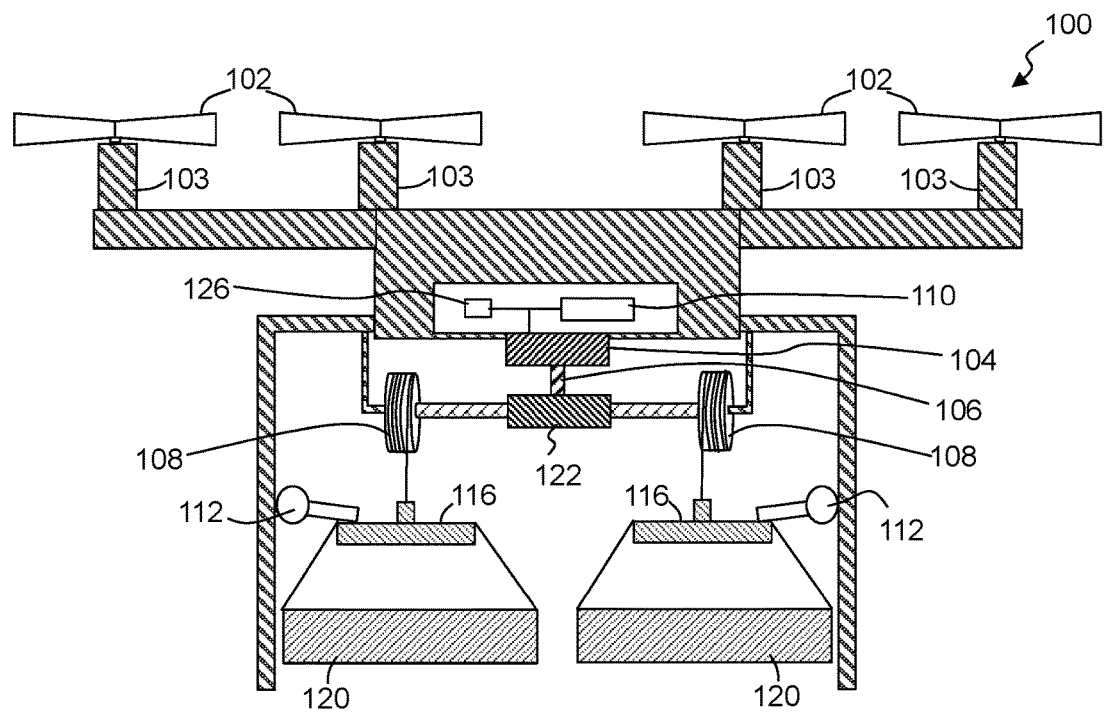
FIG. 1 illustrates a simplified, partial cross-sectional view of an exemplary unmanned delivery system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful in delivering one or more packages and/or cargo from an unmanned delivery aircraft. Delivery aircrafts can further be configured to provide the ability to deliver a package and/or cargo to an intended destination without having to physically land the delivery aircraft. In some implementations, the delivery aircraft can be controlled to maintain a stable hover above an intended delivery location (e.g., around 10-50 feet off above the intended delivery site and/or the ground). Maintaining the aircraft at an elevation can make the delivery safer to both humans, animals, property, and the like, for example because they would not encounter the spinning propellers of the delivery aircraft. The delivery aircraft, while hovering, can lower the package through a crane system. The aircraft can include, in part, a crane motor fixed to the delivery aircraft. The crane motor cooperates with a rotational drive shaft that is rotated by the crane motor. One or more crane systems can be selectively cooperated with the drive shaft. Further, some implementations include one or more stop switches that electrically couple with a control circuit of a delivery aircraft and/or a delivery control system of the delivery aircraft. The stop switch or switches are secured with the delivery aircraft in a position to be contacted by a package release hanger secured with a cord of the crane system when the cord is retracted to a first threshold relative to the delivery aircraft. The control circuit is configured to stop the crane motor in response to receiving a signal from the stop switch.

FIG. 1 illustrates a simplified, partial cross-sectional view of an exemplary unmanned delivery system that comprises an unmanned delivery aircraft 100, in accordance with some embodiments. In some implementations, the delivery aircraft includes multiple propellers 102 that cooperate with one or more propeller motors 103. The number and configuration of the propellers can depend on various aspects, such as but not limited to size of aircraft, expected weights to be lifted, range of travel, other such factors, and typically a combination of two or more of such factors. The propellers allow the aircraft to lift one or more packages and carry the one or more packages to one or more desired delivery sites. Again, the propellers can be controlled, in some instances, to hover over a desired delivery location while one or more packages are lowered. In some implementations, the delivery system further includes one or more crane motors 104 fixed to the delivery aircraft. The crane motor typically cooperates with one or more rotational drive shafts 106 that is rotated by the crane motor. One or more crane systems 108 can couple to and/or be selectively cooperated with the drive shaft 106. Each crane system typically includes at least one cord, cable, rope, or other structure that is unspooled and retracted through the respective crane system in implementing the delivery of packages. The rotation of the drive shaft can control the crane system in controlling the unspooling and retraction of a cord.

The delivery system typically further includes one or more control systems 110 or delivery control systems coupled with at least the one or more crane motors 104. The control system in part provides control of the crane motor in controlling the unspooling and retraction of the respective cords of the one or more crane systems. The control system may be separate from a control system that controls the flight of the delivery aircraft, while in other implementations the control system may provide at least some control over the delivery aircraft in addition to providing control over the crane motor, transmission 122, and other components of the delivery system of the delivery aircraft. In some embodiments, the unmanned delivery aircraft 100 further includes a transmission 122, gear shift, or other such system that cooperates with the drive shaft 106. The transmission can selectively couple the drive shaft with one or more of the crane systems 108 and/or selectively activates one or more of the crane systems. The control system 110 further couples with and controls the transmission to selectively cooperate the drive shaft with one of the two or more crane systems. The control system additionally controls the crane motor 104 to drive the drive shaft to rotate the selected one of the crane systems cooperated through the transmission 122 with the drive shaft in preforming one of unspooling and retracting the corresponding cord.

Some embodiments further include one or more stop switches 112 that are electrically coupled with the control system 110 and secured with the delivery aircraft 100. The one or more stop switches are secured in positions to be contacted by a package release hanger 116 secured with the first cord, or a package 120 temporarily cooperated with a package release hanger 116, when the cord is retracted to a halt threshold relative to the delivery aircraft. The stop switches may be implemented through one or more different types of detectors that trigger the stopping of the retracting of the cord. For example, the one or more stop switches may include a button that is contacted by the package release hanger and/or package; a lever arm may be rotationally coupled with and extend from a spring biased hinge or other such structure that releases a button or disengages an electrical contact upon the lever arm being rotated and/or lifted a threshold amount; one or more magnetic detectors may be placed to detect the package release hanger 116; one or more distance measurement systems (e.g., laser measurement system) may be used to detect when the package release hanger is within a threshold distance, for example, from the crane system; other such stop switches; or combination of two or more of such stop switches. As a further example, when the stop switch includes a lever arm, upon movement of the lever arm an electrical contact is made or disconnected, a button is pushed, or other such effect that confirms a contact of the stop switch. In response to being contacted, the one or more stop switches communicate a stop signal to the control system 110. The control system can stop the crane motor and/or trigger the transmission to disengage a drive shaft in response to receiving the signal from one or more stop switches.

Figure 2:
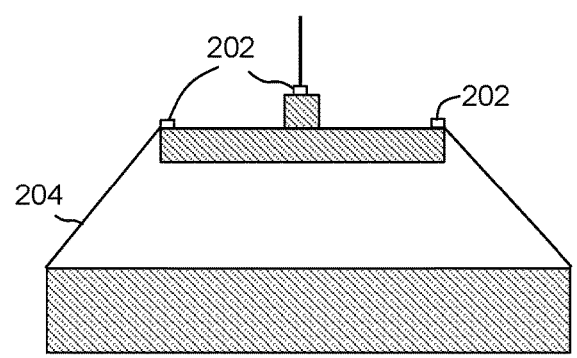
FIG. 2 illustrates a simplified cross-sectional view of an exemplary package release hanger that includes one or more release detectors, in accordance with some embodiments.

The unmanned delivery aircraft can, in at least some implementations, further include one or more package release detectors. For example, one or more release detectors can be secured on the package release hanger 116 configured to detect a release of a package supported by the release hanger. FIG. 2 illustrates a simplified cross-sectional view of an exemplary package release hanger 116 that includes one or more release detectors 202, in accordance with some embodiments. The release detector or detectors 202 can detect when a package 120 has been released from the package release hanger. For example, the one or more of the release detectors detect a change in weight, a disconnection between components of the detector, a detection of a change in magnetic forces, other such detection or combination of two or more of such detections. In some applications, for example, a package 120 is cooperated with the package release hanger through one or more rods 204, ropes, ties, or the like. The rods 204 may release upon contact of the package with the delivery surface, such as springing out of one or more slots on the package release hanger. This release may be detected by one or more release detectors 202 through a loss of an electrical connection, a release of a button, a detected change in weight, or other such detection. Additionally in some applications, when multiple release detectors are employed, the detected release can be confirmed by the indication of the two or more release detectors. Further, an error or warning may be issued in the event one or more detectors indicate a release while one or more other detectors do not indicate a release of the package. The release detectors can transmit a release signal in response to detecting the release of the package. In some implementations, the release signal is communicated to the control circuit of the control systems 110. The control circuit can, in some applications, initiate a retraction of one or more cords in response to receiving the release signal.

Some embodiments include one or more height detection systems 126. For example, the unmanned delivery aircraft can include one or more sonar height detection systems secured with the delivery aircraft and coupled with the control system 110. The sonar height detection system can be configured to provide height information corresponding to a height the unmanned delivery aircraft is above a delivery surface to the control system. The control system can utilize the height information, at least in part, in controlling the crane motor 104 based on a height of the unmanned delivery aircraft over a delivery location.

In some embodiments, the control system controls the crane motor 104 to induce variable speeds as one or more crane systems being operated to unspool and/or retracted the corresponding cord. For example, the speed of unspooling can be initiated at a first relatively slow speed. The speed of unspooling can then be increased between a first length and a second length of the cord. In some instances, an unspooling speed increase can be initiated after a package release hanger 116 has been lowered below a landing gear of the delivery aircraft. The speed may continue to increase over a length of the cord, which is typically relative to a height of the aircraft. For example, the speed of unspooling may continue to increase until the package is at least half way, two thirds or some other fraction of the distance to the delivery surface. Similarly, the control system can control the crane motor 104 to subsequently decrease the unspooling speed between a third length and a fourth length of the cord. The decrease in speed is typically also dependent on the height of the aircraft relative to the delivery surface and/or the predicted height of the package above the delivery surface. The control system can control the crane motor to induce the variable speeds and control changes in speed as a function of a predicted height of a package above the delivery surface determined based on the height information obtained from the sonar height detection system or other height detector. Further, the thresholds of when to stop increasing speeds and/or when to start decreasing speeds can further depend on the capabilities of the crane system, package weight and other such factors. In some instances, the speed of spooling is maintained at a maximum speed for a threshold length of cord before the deceleration is initiated. For example, the speed of unspooling may be increased until the package is approximately half way to the delivery surface and the speed is maintained until the package is within a threshold distance of the delivery surface. The speed of decent can then be slowed to a relatively slow pace such that the package contacts the delivery surface at less than a contact speed threshold to avoid damage to the package and/or product in the package. Accordingly, the contact speed threshold may depend on the type of product being delivered, the packaging and other such factors, and may vary between products and/or packaging.

Figure 3:
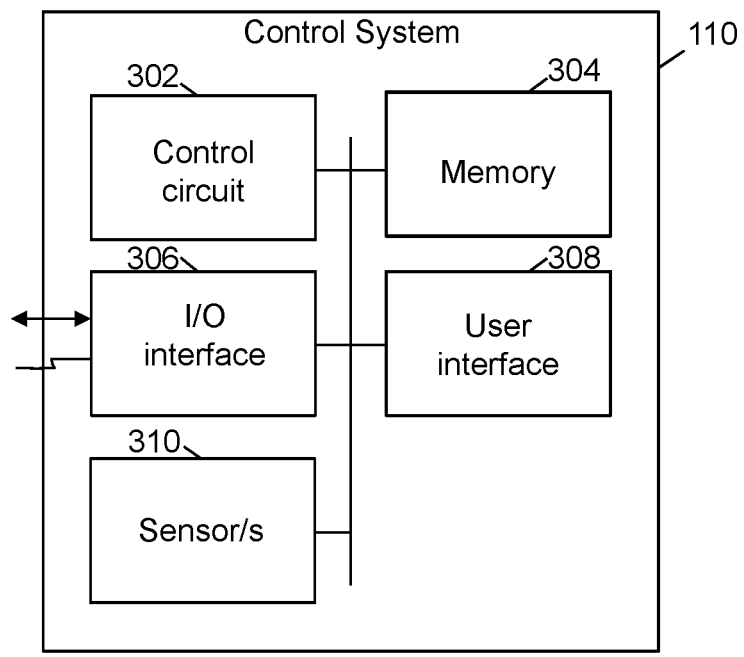
FIG. 3 illustrates a simplified block diagram of an exemplary delivery aircraft control system that provides control over at least the crane motor and transmission, in accordance with some embodiments.

FIG. 3 illustrates a simplified block diagram of at least an exemplary control system 110 that provides control over at least the crane motor 104 and transmission 122, in accordance with some embodiments. In some implementations, the control system may further provide control of the operation of the delivery aircraft. The control system 110 can perform one or more functions in providing control over unspooling and retracting of package cords for one or more crane systems. In this example, the control system 110 includes a control circuit 302, memory 304, and one or more input/output (I/O) interfaces 306. In some implementations, the control system includes or couples with one or more user interfaces 308 configured to allow users to interact with the control system and/or the unmanned delivery aircraft.

The control circuit 302 typically comprises one or more processors and/or microprocessors. The control circuit couples with and/or includes the memory 304. Generally, the memory 304 stores the operational code or one or more sets of instructions that are executed by the control circuit 302 and/or processor to implement the functionality of the control system. In some implementations, the memory further stores code, instructions and corresponding data to allow the control system to control the one or more crane systems 108, one or more crane motor 104, one or more transmissions 122, and other such operations. Such data may be pre-stored in the memory or be received, for example, from an inventory systems, a product ordering system (e.g., operated through a web site, an APP on a user interface unit, etc.), point of sale systems, distribution facility system, shopping facility systems, user interface units (e.g., a user's personal smart phone, a distribution center supplied inventory device, etc.), other sources, or combinations of such sources.

The control circuit may be implemented as one or more processor devices as are well known in the art. Similarly, the memory 304 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 304 is shown as internal to the control system; however, the memory 304 can be internal, external or a combination of internal and external memory. In some instances, the control circuit 302 and the memory 304 may be integrated together, such as in a microcontroller, application specification integrated circuit, field programmable gate array or other such device, or may be separate devices coupled together. In some applications, the control circuit 302 comprises a fixed-purpose hard-wired platform or can comprise a partially or wholly programmable platform. These architectural options are well known and understood in the art and require no further description here. The control circuit can be configured (for example, by using corresponding programming as will be well understood by those skilled in the art) to carry out one or more of the steps, actions, and/or functions described herein.

The one or more I/O interfaces 306 allow wired and/or wireless communication coupling of the control circuit 302 and/or the control system to external components, such as other control systems of the delivery aircraft, an inventory system, a distribution center system, delivery location systems, one or more databases, user interface units, point of sale systems and other such components. Accordingly, the I/O interface 306 may include any known wired and/or wireless interfacing device, circuit and/or connecting device, such as but not limited to transceivers, receivers, transmitters, and the like. For example, in some implementations, the I/O interface 306 provides wireless communication in accordance with one or more wireless protocols (e.g., cellular, Wi-Fi, Bluetooth, radio frequency (RF), other such wireless communication, or combinations of such communications).

In some embodiments the control system may include one or more user interfaces 308 in and/or coupled with the control system, and can include substantially any known input device, such one or more buttons, knobs, selectors, switches, keys, touch input surfaces, scanners, displays, etc. Additionally, the user interface may include one or more output display devices, such as lights, visual indicators, display screens, etc. to convey information to a user, such as status information of the control system 110 and/or the delivery aircraft 100, history information, scheduled product deliveries, delivery location information, customer location information, product information, product identifiers, customer profile information, graphical user interfaces, purchase information, notifications, errors, conditions and/or other such information. Additionally, the control system includes and/or couples with a power supply (not shown). While FIG. 3 illustrates the various components being coupled together via a bus, it is understood that the various components may actually be coupled to the control circuit 302 and/or one or more other components directly.

In some embodiments, the control system 110 includes and/or couples with one or more sensors 310 and/or other such input devices. For example, the control system may include or couple with one or more height detection systems 126, one or more stop switches 112, one or more motor speed sensors, one or more drive shaft indexers, one or more package release sensors, one or more package detectors, other such sensors, or combination of two or more of such sensors.

The control circuit may further communicate with the delivery aircraft 102. Information such as delivery location coordinates, activation commands, overrides, halt commands, and the like can be communicated via wired and/or wireless communication. In some instances, the control circuit can activate the delivery aircraft to secure the package with the aircraft. This can include triggering the crane motor 104 to retract the one or more cords to secure package. For example, a user can activate a button or other indicator on the user interface 308 indicating that a package 120 has been cooperated with the package release hanger 116 and/or the delivery aircraft.

Figure 4:
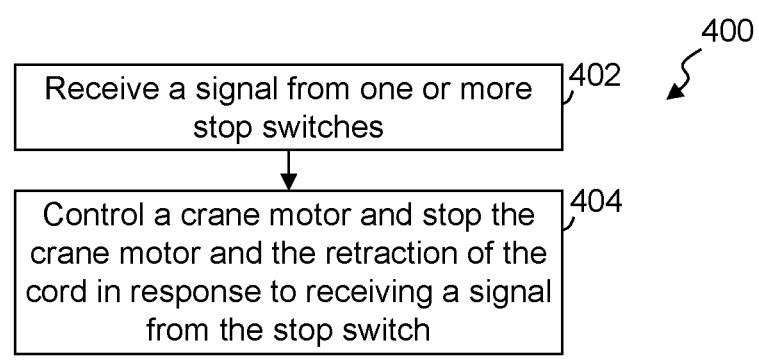
FIG. 4 illustrates a simplified flow diagram of an exemplary process of controlling package delivery, in accordance with some embodiments.

FIG. 4 illustrates a simplified flow diagram of an exemplary process 400 of controlling package delivery, in accordance with some embodiments, such as through the control circuit 302 cooperated with the unmanned delivery aircraft 100. In step 402, a signal is received from one or more stop switches 112 indicating that a package and/or package release hanger has been retracted to a threshold. Again, the stop switch is secured with the delivery aircraft 100 in a position to be contacted by a package release hanger 116 and/or package 120 secured with a cord as the cord is retracted to a threshold.

In step 404, control the one or more crane motors 104, which are fixed to the delivery aircraft and further cooperated with a drive shaft 106 to drive the drive shaft to rotate one or more crane systems, by the control circuit 302 and stopping the crane motor and the retraction of the first cord in response to receiving a signal from the stop switch. In some embodiments, the control system further controls the transmission 122 to selectively cooperate the drive shaft 106 with one or more of the multiple crane systems. The crane motor can further be controlled to drive the drive shaft to rotate the one or more crane systems cooperated by the transmission with the drive shaft in preforming one of retracting and unspooling a corresponding cord.

Some embodiments further detect, through a release detector secured on the package release hanger, a release of a package 120 supported by the package release hanger 116. The control circuit 302 can receive a release signal in response to the detection of the release of the package. Based on the release signal, the control circuit can further control the crane motor and/or transmission to cause the retraction of the cord. The speed of retraction can be a fixed speed, or may vary (e.g., based on distance of the package release hanger from the delivery aircraft). Similarly, the speeds may be controlled based on one or more factors such as but not limited to current wind conditions, proximity of external structures, available stored battery power, and other such factors. In some instances height information can be through a sonar height detection system secured with the unmanned delivery aircraft. The height information corresponds to a height the unmanned delivery aircraft is above a delivery surface. The control circuit 302 can control the crane motor 104 based on the height the unmanned delivery aircraft is above the delivery location.

Again, the control system may control the motor and/or transmission to enable variable speed of unspooling and/or retracting the cord. In some instances, the crane motor is controlled to induce variable speeds as a crane system 108 is being unspooled. For example, an unspooling can be initiated at a first speed, and the speed can be increased between a first length and a second length of the cord. The speed of unspooling can then be subsequently decreased between a third length and a fourth length of the cord as the package approaches the delivery surface. In some instances, the decreasing of the unspooling speed can be based on the package and/or package release hanger 116 reaching a threshold distance from the delivery surface. As such, the crane motor can be controlled to induce the variable speeds control changes in speed as a function of a predicted height of a package above the delivery surface determined based on the height information obtained from the sonar height detection system. Further, the control circuit can direct one or more propeller motors, based at least in part on the height information, to maintain a stable position of the delivery aircraft at a stable threshold delivery height relative to the delivery surface while controlling the crane motor in unspooling the first cord.

In some embodiments, systems, apparatuses and methods are provided to enhance delivery of packages and/or cargo through the use of unmanned delivery aircraft. In some embodiments, an unmanned delivery system is provided that comprises: a rotational drive shaft; a crane motor fixed to an unmanned delivery aircraft, wherein the crane motor is further cooperated with the rotational drive shaft that is rotated by the crane motor; a first crane system with a first cord fixed with the first crane system, wherein the first crane system is configured to cooperate with the drive shaft to control the first crane system in controlling the spooling and retraction of the first cord; a control circuit coupled with the crane motor; and a stop switch electrically coupled with the control circuit and secured with the unmanned delivery aircraft in a position to be contacted by a package release hanger secured with the first cord when the first cord is retracted to a first threshold relative to the unmanned delivery aircraft; wherein the control circuit is configured to stop the crane motor in response to receiving a signal from the stop switch.

In some embodiments, a method of delivering packages, comprises: by a control circuit cooperated with an unmanned delivery aircraft: receiving a signal from a stop switch that is secured with the unmanned delivery aircraft in a position to be contacted by a package release hanger secured with the first cord when the first cord is retracted to a first threshold; and controlling a crane motor fixed to the unmanned delivery aircraft and further cooperated with a drive shaft to drive the drive shaft to rotate a first crane system having a first cord fixed to the first crane system in retracting the first cord, and stopping the crane motor and the retraction of the first cord in response to receiving a signal from the stop switch.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:
1. An unmanned delivery system, comprising:
a rotational drive shaft;
a crane motor fixed to an unmanned delivery aircraft, wherein the crane motor is further cooperated with a drive shaft that is rotated by the crane motor;
a first crane system with a first cord fixed with the first crane system, wherein the first crane system is configured to cooperate with the drive shaft to control the first crane system in controlling the spooling and retraction of the first cord;
a control circuit coupled with the crane motor;
a stop switch electrically coupled with the control circuit and secured with the unmanned delivery aircraft in a position to be contacted by a package release hanger secured with the first cord when the first cord is retracted to a first threshold relative to the unmanned delivery aircraft;
wherein the control circuit is configured to stop the crane motor in response to receiving a signal from the stop switch;
a second crane system with a second cord fixed with the second crane system; and
a transmission cooperated between the crane motor and the rotational drive shaft and configured to selectively cooperate the drive shaft through the transmission with one of the first crane system and the second crane system;
wherein the control circuit is coupled with the transmission and controls the transmission to selectively cooperate the drive shaft with one of the first crane system and the second crane system, and controls the crane motor to drive the drive shaft to rotate the one of the first crane system and the second crane system cooperated with the drive shaft in performing one of retracting and unspooling one of the first cord and the second cord.

2. The unmanned delivery system of claim 1, further comprising:
a release detector secured on the package release hanger configured to detect a release of a package supported by the package release hanger and transmit a release signal in response to detecting the release of the package, wherein the control circuit is configured to receive the release signal and initiate a retraction of the one of the first cord and the second cord in response to receiving the release signal.

3. The unmanned delivery system of claim 1, further comprising:
a sonar height detection system secured with the unmanned delivery aircraft and coupled with the control circuit, wherein the sonar height detection system is configured to provide height information corresponding to a height the unmanned delivery aircraft is above a delivery surface to the control circuit;
wherein the control circuit is further configured to control the crane motor based on a height the unmanned delivery aircraft is above the delivery surface.

4. The unmanned delivery system of claim 3, wherein the control circuit is further configured to control the crane motor to induce variable speeds as the first crane system is being unspooled such that the speed of unspooling is initiated at a first speed, the speed of unspooling is increased between a first length and a second length of the first cord, and subsequently decreased between a third length and a fourth length of the first cord.

5. The unmanned delivery system of claim 4, wherein the control circuit in controlling the crane motor to induce the variable speed further controls changes in speed as a function of a predicted height of a package above the delivery surface determined based on the height information obtained from the sonar height detection system.

6. The unmanned delivery system of claim 4, further comprising:
a plurality of propeller motors each cooperated with a propeller and configured to drive the propellers to control the movement of the unmanned delivery aircraft;
wherein the control circuit is further coupled with the plurality of propeller motors and configured to, based at least in part on the height information, further direct the propeller motors to maintain a stable position of the unmanned delivery aircraft at a stable threshold delivery height relative to the delivery surface while controlling the crane motor in unspooling the first cord.

7. A method of delivering packages, comprising:
by a control circuit cooperated with an unmanned delivery aircraft:
controlling a crane motor fixed to the unmanned delivery aircraft and further cooperated with a drive shaft to drive the drive shaft to rotate a first crane system having the first cord fixed to the first crane system in extending and retracting the first cord;
controlling a transmission to selectively cooperate through the transmission the drive shaft with one of the first crane system and a second crane system having a second cord fixed with the second crane system; and
controlling the crane motor to drive the drive shaft to rotate the one of the first crane system and the second crane system cooperated with the drive shaft in performing one of retracting and unspooling one of the first cord and the second cord.

8. The method claim 7, further comprising:
detecting, through a release detector secured on the package release hanger, a release of a package supported by the package release hanger; and
receiving, at the control circuit, a release signal in response to the detection of the release of the package.

9. The method of claim 7, further comprising:
receiving, through a sonar height detection system secured with the unmanned delivery aircraft, height information corresponding to a height the unmanned delivery aircraft is above a delivery surface; and
controlling the crane motor based on the height the unmanned delivery aircraft is above the delivery surface.

10. The method of claim 9, wherein the controlling the crane motor further comprises controlling the crane motor to induce variable speeds as the first crane system is being unspooled, comprising:
initiating unspooling at a first speed;
increasing the speed of unspooling between a first length and a second length of the first cord; and
subsequently decreasing a speed of unspooling between a third length and a fourth length of the first cord.

11. The method of claim 10, wherein the controlling the crane motor further comprises controlling the crane motor and changing an unspooling speed as a function of a predicted height of a package above the delivery surface determined based on the height information obtained from the sonar height detection system.

12. The method of claim 10, further comprising:
directing, through the control circuit and based at least in part on the height information, propeller motors of the unmanned delivery aircraft to maintain a stable position of the unmanned delivery aircraft at a stable threshold delivery height relative to the delivery surface while controlling the crane motor in unspooling the first cord.

* * * * *

UNITED STATES PATENT AND TRADEMARK OFFICE
CERTIFICATE OF CORRECTION

PATENT NO. : 10,301,020 B2
APPLICATION NO. : 15/271784
DATED : May 28, 2019
INVENTOR(S) : Nathan G. Jones et al.

It is certified that error appears in the above-identified patent and that said Letters Patent is hereby corrected as shown below:

In the Claims

Column 10, Line 15, Claim 8, insert --of-- after "method".

Signed and Sealed this
Twenty-fourth Day of September, 2019

Andrei Iancu
*Director of the United States Patent and Trademark Office*